Feb. 19, 1952  J. W. LE PREE  2,586,067
TAP OR REAMER DRIVER
Filed April 13, 1948
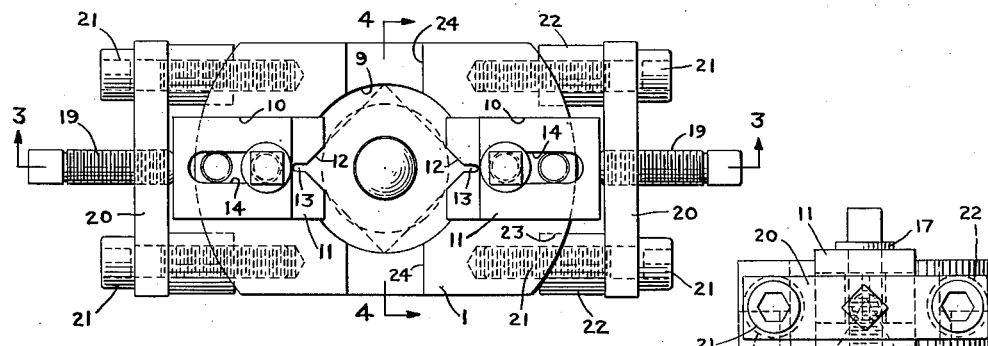
FIG. 1
FIG. 2
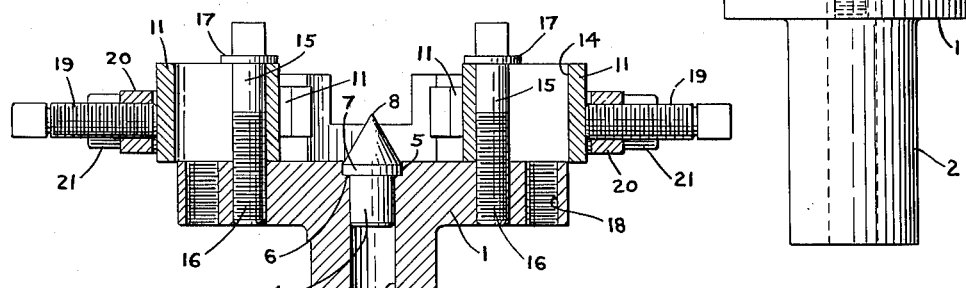
FIG. 3
FIG. 4
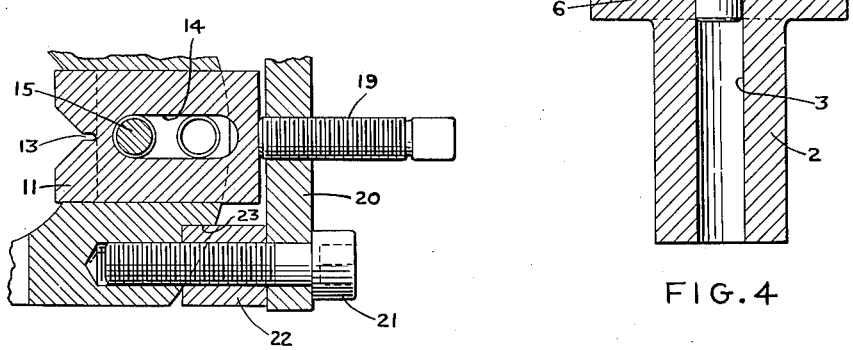
FIG. 5
JAMES W. LE PREE
*INVENTOR.*
BY *Robt Meyer*
*attorney*

Patented Feb. 19, 1952

2,586,067

UNITED STATES PATENT OFFICE 2,586,067

TAP OR REAMER DRIVER

James W. Le Pree, Newark, N. J.

Application April 13, 1948, Serial No. 20,812

2 Claims. (Cl. 279—110)

This invention relates to tools or tool holders and, more particularly, to a driver or device for holding a tap, reamer, or like tool, during a threading, reaming or analogous operation.

Heretofore, it has been necessary when using square shanked taps, reamers, or the like, on various machines such as turret lathes, to have a driver or adaptor for each different size of tap or reamer, and often the shanks of the tap or reamer are slightly off size. If they are slightly oversize, they will not fit in the adaptor or driver and, if undersize, will permit a limited wobbling, causing a belling of the metal at the beginning of the tapping or reaming operation. Then, also, it is difficult and an intricate operation to properly center the tool.

The tap or reamer drivers now in use to hold and drive taps, reamers, or analogous tools, when used on turret lathes or similar machines, are comparatively cumbersome, expensive, and so constructed that it is a tedious time-absorbing operation to connect a tap or reamer thereto and properly center it to prevent wobbling of the tool with the resultant belling of the end of a hole in a reaming operation or uneven depth of cutting of threads and, further, they are so constructed that a driver is provided for each size of tap or reamer. It is often the case that the shank of a tap or reamer will be slightly oversize, which adds to the difficulty of its connection with the driver.

It is an object of the present invention to provide a tap or reamer driver which is comparatively simple in construction and low in cost, so constructed as to receive taps or reamers of different diameters within certain diameter ranges, and one which will securely hold the tap or reamer in position and will drive it straight off the center of rotation to keep the tool in alignment with the work.

Another object of the invention is to provide a driver for taps, reamers, or analogous tools when used on turret lathes or similar machines, which will permit the connection of a tool to the driver in proper centered position in a minimum amount of time.

A further object of the present invention is a provision of a driver for taps, reamers, or other similar tools, which embodies means whereby the operator can readily see if the center points of the driver and the tool are in line and can also see clearly to properly center the tool when connecting it to the driver.

With these and other objects in view, as may appear from the accompanying specification, the invention consists of various features of construction and combination of parts, which will be first described in connection with the accompanying drawings, showing a tap or reamer driver of a preferred form embodying the invention, and the features forming the invention will be specifically pointed out in the claims.

In the drawings:

Figure 1 is a top plan view of the tap or reamer driver.

Figure 2 is a side elevation of the tap or reamer driver.

Figure 3 is a longitudinal section through the tap or reamer driver taken on line 3—3 of Figure 1.

Figure 4 is a cross section through the driver taken on the line 4—4 of Figure 1.

Figure 5 is a fragmentary horizontal section of the driver.

Referring more particularly to the drawings, the improved tool holder and driver comprises a table 1 having a shank 2 formed integrally thereon and projecting laterally from the center of one face or the back of the table 1. The shank 2 is provided with a central bore 3 which has inserted therein the centering point 4. Where the bore 3 of the shank 2 opens out through the face of the table 1 it is counterbored as shown at 5, to provide a shoulder 6 against which the shoulder of the offset head 7 of the centering point 4 rests. In the construction of the tool holder, the bore 3 is accurately centered and the centering point 4 is machined and ground to a high degree of accuracy so that its longitudinal center passing through the point 8 will be in exact alignment with the center of the shank 2.

The face of the table 1 is provided with a centrally located cutout circular portion 9, the center of which aligns with the center of the centering point 4. The table 1 is also provided with a pair of diametrically opposed longitudinally extending recesses 10 which receive therein the clamping blocks 11. The inner ends of the clamping blocks 11 extend into the circular recess 9, as clearly shown in Figure 1 of the drawings, and they have their facing ends provided with cutouts 12, the sides of which are cut at 45° angles to each other, are accurately ground and terminate at their inner ends in longitudinally extending recesses 13 so as to permit the accurate setting of the corners of the shank of a tool (not shown) such as a cap reamer, or the like.

The clamping blocks 11 are slidable in the recesses or cutouts 10 and each of them is provided with a longitudinally extending slot 14 extending vertically therethrough and through which a guiding stud 15 extends. The studs 15 are threaded into threaded openings 16 formed in the table 1 and they have annular flanges 17 formed thereon which overlap the upper edges of the guiding slots 14 so as to prevent vertical wobbling or oscillation of the clamping blocks, and the studs 15 fit the guiding slots 14 with a sufficient degree of tightness to prevent wobbling of the clamping blocks but to permit the clamping blocks to be moved longitudinally relative to the guiding studs. The table 1 has a plurality of sets of threaded openings corresponding to the opening 16, which are indicated at 18, so as to permit positioning of the guiding studs at differently spaced differences from the axis of the centering point 4 and the shank 2 and, consequently, permit different spacing of the facing ends of the clamping blocks. As clearly shown in Figure 3 of the drawings, the inner facing ends of the clamping blocks 11 which are provided with the recesses 12 are narrower than the major guiding portions of the clamping blocks but embody sufficient surface area to securely engage and clamp the shank of a tool.

The clamping blocks 11 are adjusted longitudinally by means of adjusting studs 19, one of which is provided for each of the clamping blocks. The adjusting studs 19 are threadably carried by carrying bars 20. The carrying bars 20 are connected to the table 1 by means of studs 21 and spacing collars 22. As shown in Figure 1 of the drawings, the ends of the table 1 are curved, and to provide proper positioning of the carrying bars 20 the ends of the table are cut out, as shown at 23 in Figure 5 of the drawings, to receive the ends of the spacing collars 22 and to permit flat, firm and accurate setting of the spacing collars against the ends of the table 1.

To permit clear visioning of the tip of the centering point 4 so as to facilitate the insertion of this point in the center recess in the shank of a tool, the table 1 is cut away to form laterally extending openings 24 which open into the central circular recess 9, as clearly shown in Figures 1 and 3 of the drawings. All tools, such as taps, reamers, and the like, have conical recesses drilled in their outer ends at their exact centers, made to provide proper centering of the piece of stock material during the making of the tool and, thus, by properly positioning this center recess on the tip of the centering point 4 the tool will be centrally disposed with its center in alignment with the center of the shank 2. After the tool is so positioned the clamping jaws 11 are adjusted to tightly clamp it in position and hold it against wobbling during operation, with its center aligning with the axis of rotation of the driver and of itself, thus the tool will be driven from the center or axis of rotation of the driver and of the rotating part of the machine such as a turret lathe, to which the driver is attached.

It will be understood that the invention is not to be limited to the specific construction or arrangement of parts shown, but that they may be widely modified within the invention defined by the claims.

What is claimed is:

1. In a driver for taps, reamers or analogous tools, a supporting table, a machine engaging shank on said table and projecting centrally from the back of the table, said table having a tool shank receiving recess formed centrally in its face and having a pair of radial recesses in its face opening at their inner ends into said central recess, a pair of tool shank engaging clamping blocks slidably mounted in said radial recesses and having tool shank engaging recesses at the inner end thereof, guiding slots extending longitudinally in said clamping blocks, spaced threaded bores in said table disposed perpendicularly to and formed in the radial line of said radial recess, guiding studs extending through said slots and in threaded engagement with at least one of said spaced threaded bores for guiding the adjusted movement of said clamping blocks and for holding them when so adjusted, and adjusting means for adjusting the clamping blocks into clamping position.

2. In a driver for taps, reamers or analogous tools, a supporting table, a machine engaging shank on said table and projecting centrally from the back of the table, said table having a tool shank receiving recess formed centrally in its face and having a pair of radial recesses in its face opening at their inner ends into said central recess, a pair of tool shank engaging clamping blocks slidably mounted in said radial recesses and having tool shank engaging recesses at the inner end thereof, guiding slots extending longitudinally in said clamping blocks, a first and a second threaded bore formed in said table for each of said clamping blocks and disposed perpendicularly to and formed in the radial line of said radial recess, guiding studs extending through said slots and in threaded engagement with at least one of said threaded bores, a carrying bar formed outwardly of said table and connected thereto athwart the radial line of said radial recess, and a threaded member threadably mounted in said carrying bar to abut and move said clamping bars inwardly in said recess.

JAMES W. LE PREE.

REFERENCES CITED

The following references are of record in the file of this patent:

UNITED STATES PATENTS

| Number | Name | Date |
|---|---|---|
| 407,666 | Klein | July 23, 1889 |
| 900,761 | McKim | Oct. 13, 1908 |
| 1,499,773 | Hanson | July 1, 1924 |
| 2,465,366 | Frettolosa | Mar. 29, 1949 |
| 2,469,630 | Braun | May 10, 1949 |